(12) United States Patent
Yokokawa

(10) Patent No.: US 7,339,622 B2
(45) Date of Patent: Mar. 4, 2008

(54) IMAGE DISPLAY APPARATUS, CAMERA WITH THE IMAGE DISPLAY APPARATUS, IMAGE DISPLAY CONTROL METHOD, AND RECORDING MEDIUM ON WHICH IMAGE DISPLAY CONTROL PROGRAMS ARE RECORDED

(75) Inventor: Koh Yokokawa, Akishima (JP)

(73) Assignee: Olympus Corporation, Tokyo (JP)

( * ) Notice: Subject to any disclaimer, the term of this patent is extended or adjusted under 35 U.S.C. 154(b) by 880 days.

(21) Appl. No.: 10/796,668

(22) Filed: Mar. 8, 2004

(65) Prior Publication Data

US 2004/0227834 A1    Nov. 18, 2004

(30) Foreign Application Priority Data

Mar. 11, 2003   (JP) ............................. 2003-065140

(51) Int. Cl.
*H04N 5/222* (2006.01)
(52) U.S. Cl. .............................. 348/333.01; 348/333.05
(58) Field of Classification Search ........... 348/333.01, 348/333.05, 333.11
See application file for complete search history.

(56) References Cited

U.S. PATENT DOCUMENTS 7,196,727 B2 *   3/2007   Sato ...................... 348/333.11

FOREIGN PATENT DOCUMENTS

| JP | 7-95517 A | 4/1995 |
| JP | 8-223525 A | 8/1996 |
| JP | 10-243331 A | 9/1998 |
| JP | 11-146326 A | 5/1999 |

* cited by examiner

*Primary Examiner*—Ngoc-Yen Vu
*Assistant Examiner*—Adam L Henderson
(74) *Attorney, Agent, or Firm*—Frishauf, Holtz, Goodman & Chick, P.C.

(57) ABSTRACT

An image display apparatus has an image-processing unit, an image display unit, and a jump-instructing unit. The image-processing unit generates data representing images having frame numbers. The image display unit displays the images represented by the data. The jump-instructing unit generates an instruction to cause the image display unit to display an image whose serial number differs, by a predetermined number, from that of the image being displayed by the image display unit. In response to the instruction, the image-processing unit generates data representing a multi-image consisting of images intervening between the image being displayed and the image whose serial number differs by the predetermined number. The image display unit first displays the multi-image and then the image whose serial number differs by the predetermined number.

20 Claims, 10 Drawing Sheets

IMAGE DISPLAY APPARATUS, CAMERA WITH THE IMAGE DISPLAY APPARATUS, IMAGE DISPLAY CONTROL METHOD, AND RECORDING MEDIUM ON WHICH IMAGE DISPLAY CONTROL PROGRAMS ARE RECORDED

CROSS-REFERENCE TO RELATED APPLICATIONS

This application is based upon and claims the benefit of priority from prior Japanese Patent Application No. 2003-065140, filed Mar. 11, 2003, the entire contents of which are incorporated herein by reference.

BACKGROUND OF THE INVENTION

1. Field of the Invention

The present invention relates to an image display apparatus, a camera having an image display apparatus, a method of controlling an image display apparatus, and a recording medium storing a program for controlling an image display apparatus. More particularly, the invention relates to an image display apparatus that facilitates retrieval of image data, and to a digital camera that has such an image display apparatus.

2. Description of the Related Art

The recording medium incorporated in digital cameras can store data representing many images. The recording medium may be, for example, a 64-MB memory that can store data representing 100 or more images. The current trend is to incorporate into digital cameras a recording media of a greater storage capacity. The more image data items the medium stores, the more efficiently they must be retrieved from the medium to enable the user to see the images he or she wants.

Jpn. Pat. Appln. KOKAI Publication No. 11-146326 discloses a method of retrieving image data. In this method, the buttons provided on an image display unit may be pushed to change the speed at which the image display unit reproduces and displays images one after another.

Jpn. Pat. Appln. KOKAI Publication No. 10-243331 discloses an image display apparatus for use with digital cameras, which is designed to facilitate retrieval of image data items. This apparatus has an LCD that can display four images or nine images at a time. Namely, the LCD performs so-called multi-image displaying. Seeing these images displayed, the user may select at least one image displayed, thus retrieving the data items representing the image selected.

BRIEF SUMMARY OF THE INVENTION

An object of this invention is provide an image display apparatus that can enables the user to retrieve image data items from a recording medium with high efficiency, a camera having such an image display apparatus, a method of controlling such an image display apparatus, and a recording medium storing programs for controlling such an image display apparatus.

According to a first aspect of the invention, there is provided an image display apparatus. The apparatus comprises: an image-processing unit which generates data representing images to be displayed; an image display unit which displays images represented by the data generated by the image-processing unit; a display control unit which controls the image-processing unit and the image display unit; and a jump-instructing unit which instruct the image display unit to display an image whose serial number differs, by a predetermined number, from that of the image being displayed by the image display unit. In response to an instruction from the jump-instructing unit, the display control unit causes the image-processing unit to generate data representing a multi-image consisting of images intervening between the image being displayed and the image whose serial number differs by the predetermined number.

According to a second aspect of the invention, there is provided an image display apparatus. This apparatus comprises: an image display unit which displays images; a display control unit which controls the image display unit; and a jump-instructing unit which instructs the image display unit to display an image whose serial number differs, by a predetermined number, from that of the image being displayed by the image display unit. In response to an instruction from the jump-instructing unit, the display control unit causes the image display unit to display the intervening images sequentially, each for a different period, and then to display the image whose serial number differs by the predetermined number.

According to a third aspect of the invention, there is provided a method of controlling an image display apparatus, in which the image display unit of the apparatus displays images in the order of the serial numbers of the images, in response to an instruction. The method comprises the steps of: instructing the image display unit to display an image whose serial number differs, by a predetermined number, from that of the image being displayed; generating data representing a multi-image consisting of images intervening between the image being displayed and the image whose serial number differs by the predetermined number; and displaying the intervening images and then to display the image whose serial number differs by the predetermined number.

According to a fourth aspect of this invention, there is provided a method of controlling an image display apparatus. In this method, the image display unit of the apparatus displays images in the order of the serial numbers of the images. This method comprises: the steps of: instructing the image display unit to display an image whose serial number differs, by a predetermined number, from that of the image being displayed; and causing the image display unit to display images intervening between the image being displayed and the image whose serial number differs by the predetermined number, each for a different period, and then to display the image whose serial number differs by the predetermined number, when the image display unit is instructed, in the instructing step, to display the image whose serial number differs.

According to a fifth aspect of the invention, there is provided a recording medium storing an image display control program that is executed by a computer to cause an image display unit to display images in the order of the serial numbers of the images, in response to an instruction. The program describes the steps of: instructing the image display unit to display an image whose serial number differs, by a predetermined number, from that of the image being displayed; generating data representing a multi-image consisting of images intervening between the image being displayed and the image whose serial number differs by the predetermined number, when the image display unit is instructed to display the image whose serial number differs; and causing the image display unit to display the intervening images represented by the data generated, and then to display the image whose serial number differs by the predetermined number.

According to a sixth aspect of the invention, there is provided a recording medium storing an image display control program that is executed by a computer to cause an image display unit to display images in the order of the serial numbers of the images, in response to an instruction. This program describes the steps of: instructing the image display unit to display an image whose serial number differs, by a predetermined number, from that of the image being displayed; and causing the image display unit to display images intervening between the image being displayed and the image whose serial number differs by the predetermined number, each for a different period, and then to display the image whose serial number differs by the predetermined number, when the image display unit is instructed to display the image whose serial number differs.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will be described, with reference to the accompanying drawings.

First Embodiment

Figure 1:
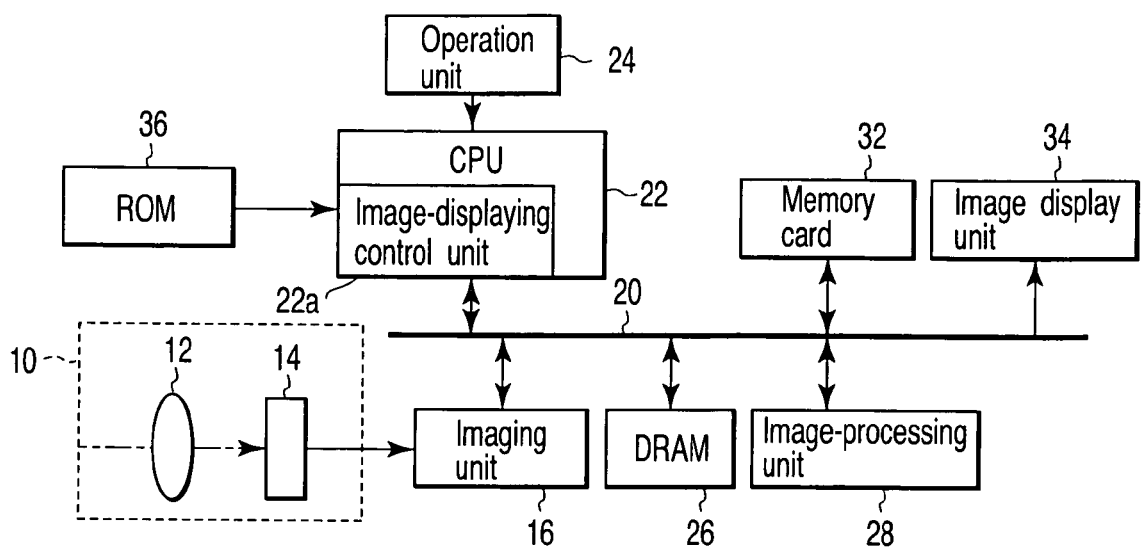
FIG. 1 is a block diagram showing the configuration of a digital camera according to a first embodiment of this invention.

FIG. 1 is a block diagram showing the configuration of a digital camera according to the first embodiment of this invention.

As FIG. 1 shows, the camera has a photographing unit 10, an imaging unit 16, a bus 20, a CPU 22, an operation unit 24, a DRAM 26, an image-processing unit 28, a memory card 32, an image display unit 34, and a ROM 36.

The photographing unit 10 has a photographing lens 12 and an imaging element 14. Light beam from an object (not shown) passes through the photographing lens 12 and reaches the imaging element 14. The imaging element 14 converts the light into an electric signal. The electric signal is supplied to the imaging unit 16. The imaging unit 16 converts the signal to digital image data.

The bus 20 connects the imaging unit 16 to the CPU 22, DRAM 26, image-processing unit 28, memory card 32 and image display unit 34.

The CPU 22 controls some of the other components of the digital camera. The CPU 22 reads various control programs from the ROM 36 and executes them. Thus, the ROM 36 can function as an image-displaying control unit 22a and the like. The CPU 22 has a timer (not shown) and the like. The image-displaying control unit 22a executes the image-displaying control program, i.e., one of the control programs, so that various operations may be carried out as will be explained with reference to flowcharts. The CPU 22 is connected to the operation unit 24. The operation unit 24 has switches (not shown) associated with selection buttons and OK button (later described), in addition to the power switch, the release switch and the zoom switch.

The DRAM 26 is a memory for temporarily storing image data to be processed and image data being processed. The image-processing unit 28 is an image-processing means for performing various processes on the image data to be stored in the memory card 32 or the image data read from the memory card 32.

The memory card 32 is a recording medium for storing image data. It can be removed from the housing of the digital camera.

The image display unit 34 is, for example, an LCD panel. It can display the images represented by the data processed by the image-processing unit 28.

Figure 2:
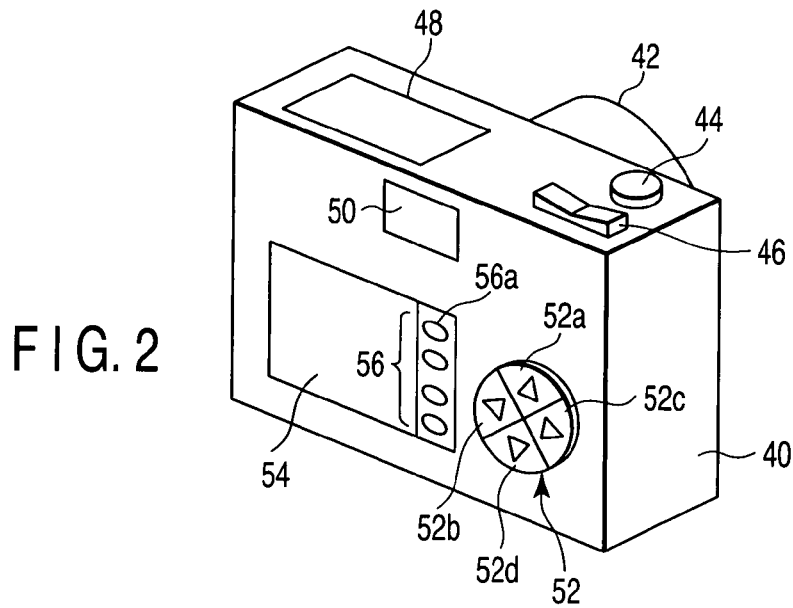
FIG. 2 is a perspective view of the camera according to the first embodiment, as viewed from the back.

FIG. 2 is a perspective view of the digital camera, as viewed from the back.

As FIG. 2 shows, the digital camera has a housing 40 and a photographing lens 42. The lens 42 is mounted on the front of the housing 40. A release button 44, a zoom button 46 and a display window 48 are provided on the upper surface of the housing 40. When the user depresses the zoom button 46, the camera performs zooming-up or zooming-down in accordance with the position that the zoom switch assumes. The display window 48 can display various items of data, including frame number or scenes to be photographed.

A finder window 50, a selection pad 52, a display (LCD) panel 54, and a plurality of buttons 56 are provided on the back of the housing 40. The selection pad 52 has four buttons 52a to 52d.

The selection pad 52 is used to move a pointer cursor on the display window 48 or the LCD panel 54. The buttons 52a, 52b, 52c and 52d are pushed, the pointer is moved upwards, to the left, to the right and downwards, respectively. Hence, they shall be referred to as "pointer-up button," "pointer-left button," "pointer-right button" and "pointer-down button," respectively. The pointer-down button 52d works not only as pointer-down button, but also as jump key, stop key and display-continuation key.

The LCD panel 54 is the image display unit 34 shown in FIG. 1. It displays any images photographed. The buttons 56 are pushed to set the camera in various operating modes, including the photographing mode and the image-reproducing mode.

One of the buttons 56 is an OK button 56a. When depressed, the OK button 56a set the camera in the mode that the user has just selected by pushing the OK button 56a. When another button 56 is pushed, multi-image jump transfer is selected. When still another button 56 is pushed, continuous reproduced-image jump transfer is selected. When the remaining button 56 is pushed, the frame number of a desired image (or the number of a desired image) is designated.

It will be described how the digital camera described above operates to reproduce image data and display the image represented by the image data reproduced. How the camera operates to photograph an object and to perform any other function will not be described.

Figure 3:
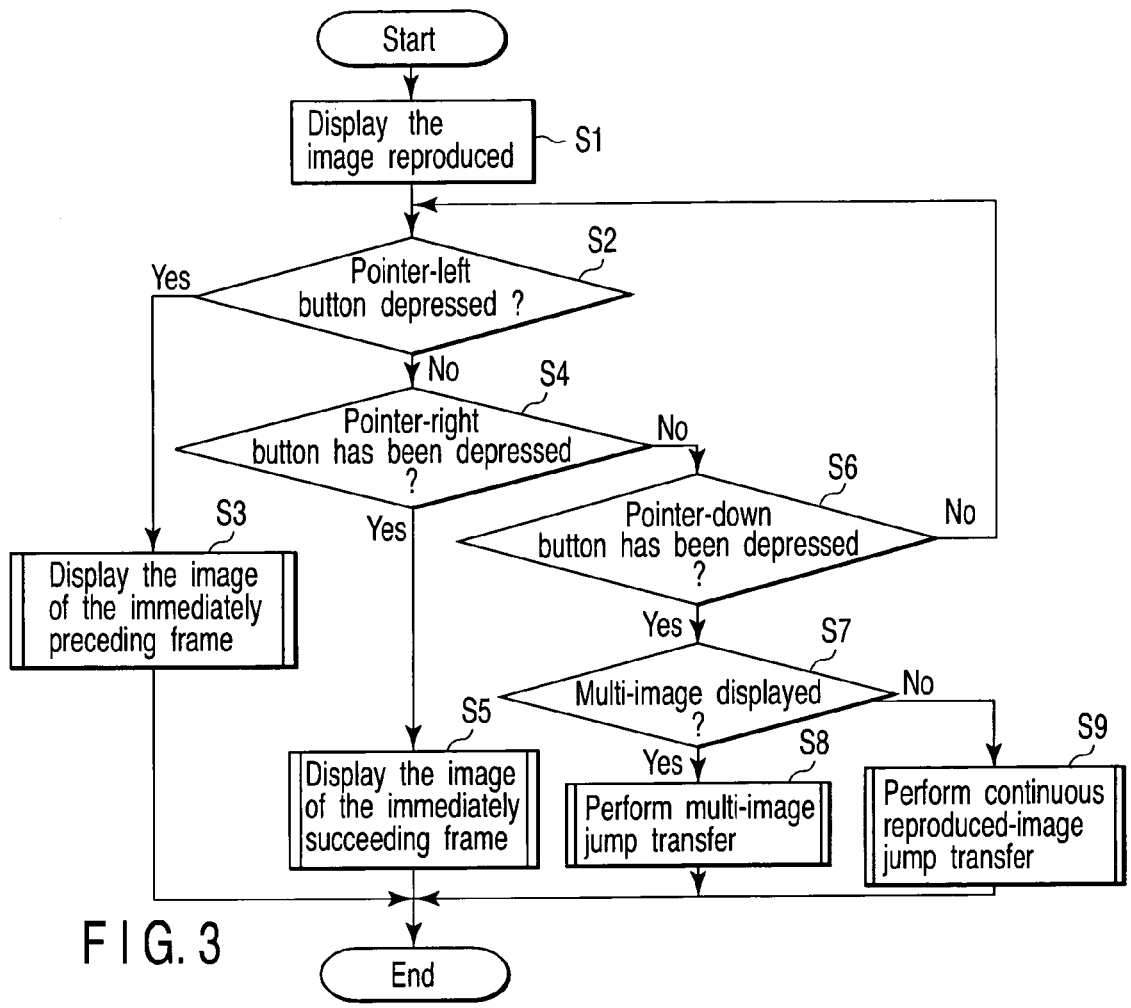
FIG. 3 is a flowchart explaining how the digital camera according to the first embodiment is operated to display images.

How the digital camera operates to display an image will be described, with reference to the flowchart of FIG. 3.

Assume that a data item may be read from the memory card 32 and input to the image-processing unit 28. The unit 28 processes the data item, which is supplied to the image display unit 34 (i.e., LCD panel 54). The image display unit 34 displays the image represented by the data item in Step S1. In this condition, the image displayed on the LCD panel 54 can be switched to another, in accordance with which button of the selection pad 52 has been depressed.

In Step S2, it is determined whether the pointer-left button 52b has been depressed. If YES, the operation goes to Step S3. In Step S3, the LCD panel 54 displays the image of the immediately preceding frame.

If NO in Step S2, that is, if the pointer-left button 52b has not been depressed, the operation goes to Step S4. In Step S4, it is determined whether the pointer-right button 52c has been depressed. If YES in Step S4, the operation goes to Step S5. In Step S5, the LCD panel 54 displays the image of the immediately succeeding frame.

If NO in Step S4, or if the pointer-right button 52c has not been depressed, the operation goes to Step S6. In Step S6, it is determined whether the pointer-down button 52d has been depressed. If YES in Step S6, the camera is set into jump transfer mode. Thus, the LCD panel 54 displays an image several frames ahead, skipping the images of the intervening frames.

Then, the operation goes to Step S7. In Step S7, it is determined whether the image of any intervening frame, which is not displayed, is a multi-image that consists of a plurality of frames that are to be displayed on the LCD display 54 at the same time. If YES in Step S7, the operation goes to Step S8, in which a multi-image jump transfer is carried out. If NO in Step S8, the operation goes to Step S9, in which a continuous reproduced-image jump transfer is performed.

How the multi-image jump transfer mentioned above is performed will be explained, with reference to FIGS. 4A to 4C that show the information displayed by the LCD display 54 and FIG. 5 that is a flowchart.

Figures 4A, 4B, 4C:
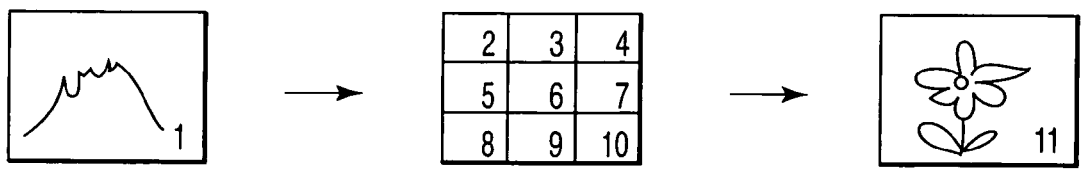
FIGS. 4A to 4C are diagrams explaining how a multi-image jump transfer is performed on the display screen in the first embodiment.
Figure 5:
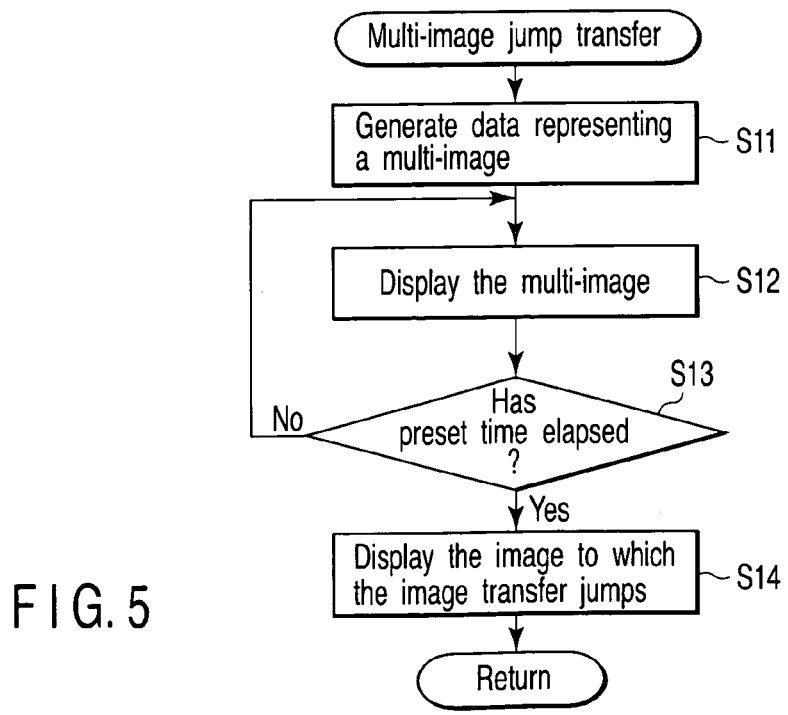
FIG. 5 is a flowchart explaining how the multi-image jump transfer is carried out in the first embodiment.

Assume that the LCD panel 54 displays the image of the first frame as is illustrated in FIG. 4A. When the user pushes the pointer-down button 52d, the digital camera starts the main routine.

It should be noted that the numbers shown in FIG. 4A to 4C are the serial numbers assigned to frames of images.

First, in Step S11, the image-processing unit 28 reads image data from the memory card 23 and processes the data, generating data representing a multi-image. The multi-image consists of nine frames, i.e., frames 2 to 10 intervening between the frame 1 that is being displayed and the frame 11 which should be displayed next. To generate the multi-image data, the image-processing unit 28 performs a known method, which will not be described herein.

In Step S12, the multi-image data is supplied to the LCD panel 54. The LCD panel displays the 9-frame multi-image represented by the multi-image data as shown in FIG. 4B. The LCD panel 54 keeps displaying the multi-image until the time preset in the timer (not shown) provided in the CPU 22 elapses. The preset time is, for example, one second. In Step S13, it is determined whether the present time has elapsed. If NO in Step S13, the operation returns to Step S12. If YES in Step S13, the operation goes to Step S14.

In Step S14, the LCD panel 54 displays the frame 11 upon lapse of the preset time, as is illustrated in FIG. 4C.

The LCD panel 54 displays a multi-image consisting of several frames. The user can perceive, at a glance, many frames represented by the data stored in the memory cared 23. Namely, the user retrieves any desired frame from many, quickly and reliably. This would be impossible if the frames are sequentially displayed, each for a very short time, as by a display of the slide-showing type.

Second Embodiment

The second embodiment of the invention will be described, with reference to FIGS. 6A to 6C that show the information displayed on a display screen and FIG. 7 that is a flowchart.

The camera according to this embodiment is identical to the camera according to the first embodiment, except the manner of performing the multi-image jump transfer. Hence, the components identical to those of the first embodiment will not be described but will be referred to, by using the same numerals.

During the multi-image jump transfer, the LCD panel 54 displays two or more multi-images one after another, not displaying only one multi-image as in the first embodiment.

Figures 6A, 6B, 6C, 6D:
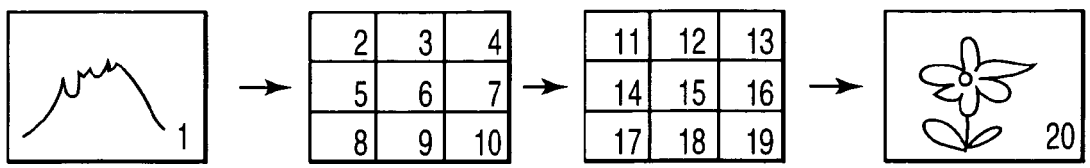
FIGS. 6A to 6D are diagrams illustrating how multi-image jump transfer is achieved on the display screen in a second embodiment of this invention.
Figure 7:
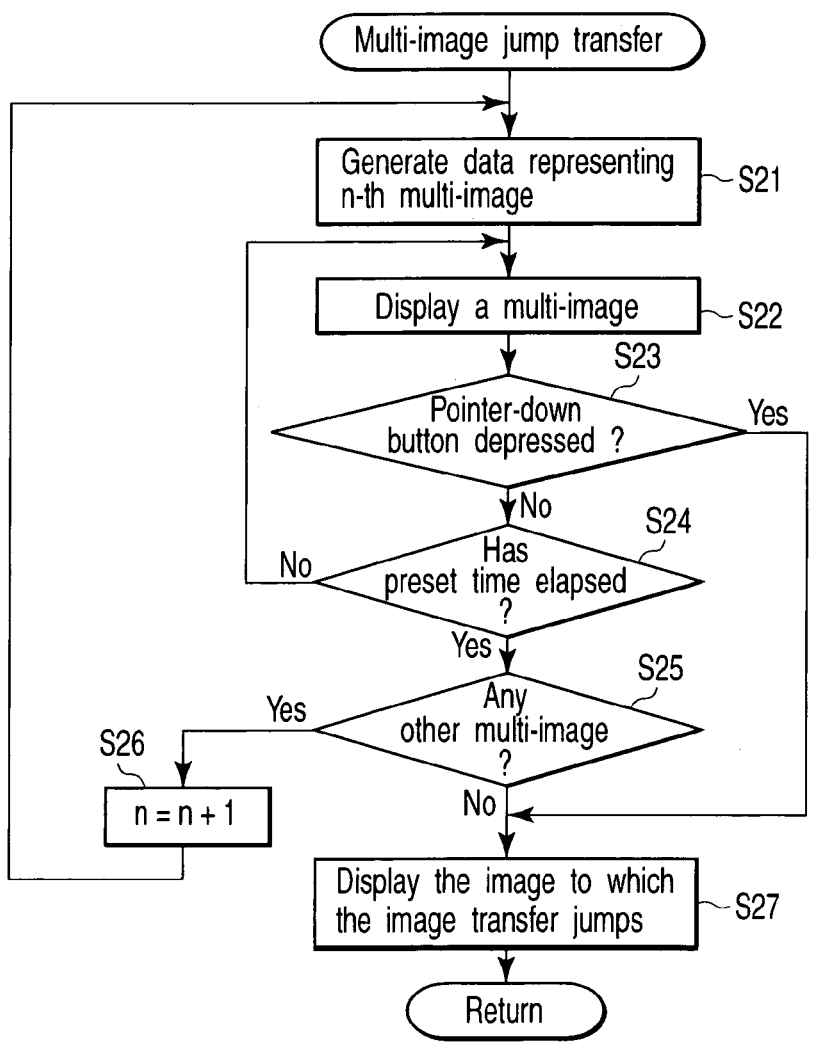
FIG. 7 is a flowchart explaining how the multi-image jump transfer is carried out in the second embodiment.

Assume that the LCD panel 54 displays the image of the first frame as shown in FIG. 6A. When the user pushes the pointer-down button 52*d*, the digital camera starts the main routine. In Step S21, the image-processing unit 28 reads image data from the memory card 32 and processes the data, generating data representing a multi-image. The multi-image consists of first nine of the frames intervening the first frame 1 and the last frame 20. That is, the multi-image consists of the frames 2 to 10. To generate the multi-image data, the image-processing unit 28 performs a known method, which will not be described herein.

In Step S22, the LCD panel 54 displays the first multi-image, or frames 2 to 10, as shown in FIG. 6B. In Step S23, it is determined whether the pointer-down button 52*d* has been depressed. If YES in Step S23, the LCD panel 54 stops displaying the first multi-image, and the operation jumps to Step S27. If NO in Step S23, the operation goes to Step S24. In Step S24, it is determined whether the time, e.g., one second, preset in the timer incorporated in the CPU 22 has elapsed. If NO in Step S24, the operation returns to Step S22. Hence, the LCD panel 54 keeps displaying the first multi-image until the reset time, for example 1 second, elapses.

If YES in Step S24, the operation goes to Step S25. In Step S25, it is determined whether there is any other multi-image. If YES in Step S25, the operation goes to Step S26. In Step S26, the number of images, n, is increased to n+1. Then, the operation returns to Step S21. In Step S21, the data representing the second multi-image, which consists of the frames 11 to 19, is generated. In Step S22, the LCD panel 54 displays the second multi-image, i.e., frames 11 to 19, as is illustrated in FIG. 6C. Then, Steps S21 to S26 are repeated.

If NO in Step S25, the operation goes to Step S27. In Step S27, the LCD panel 54 displays, as shown in FIG. 6D, the frame 20 to which image transfer jumps.

The second embodiment can display a plurality of multi-images, one after another. The user can therefore recognize the intervening frames, too, no matter how many.

Third Embodiment

The third embodiment of the invention will be described, with reference to FIGS. 8A to 8D that show the information displayed on a display screen and FIG. 9 that is a flowchart.

The camera according to the third embodiment performs a multi-image jump transfer, too, but in a different way. More specifically, the LCD panel 54 continuously displays one multi-image, not multi-images one after another as in the second embodiment.

Figures 8A, 8B, 8C, 8D:
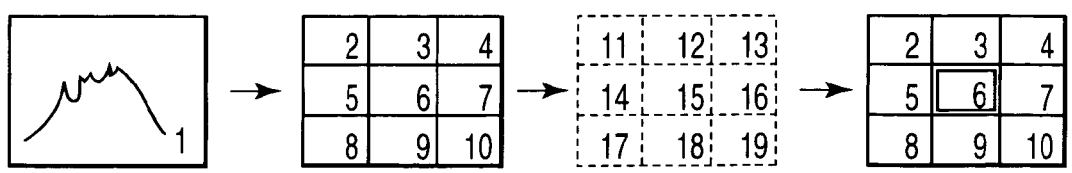
FIGS. 8A to 8D are diagrams illustrating how a multi-image jump transfer is achieved on the display screen in a third embodiment of the present invention.
Figure 9:
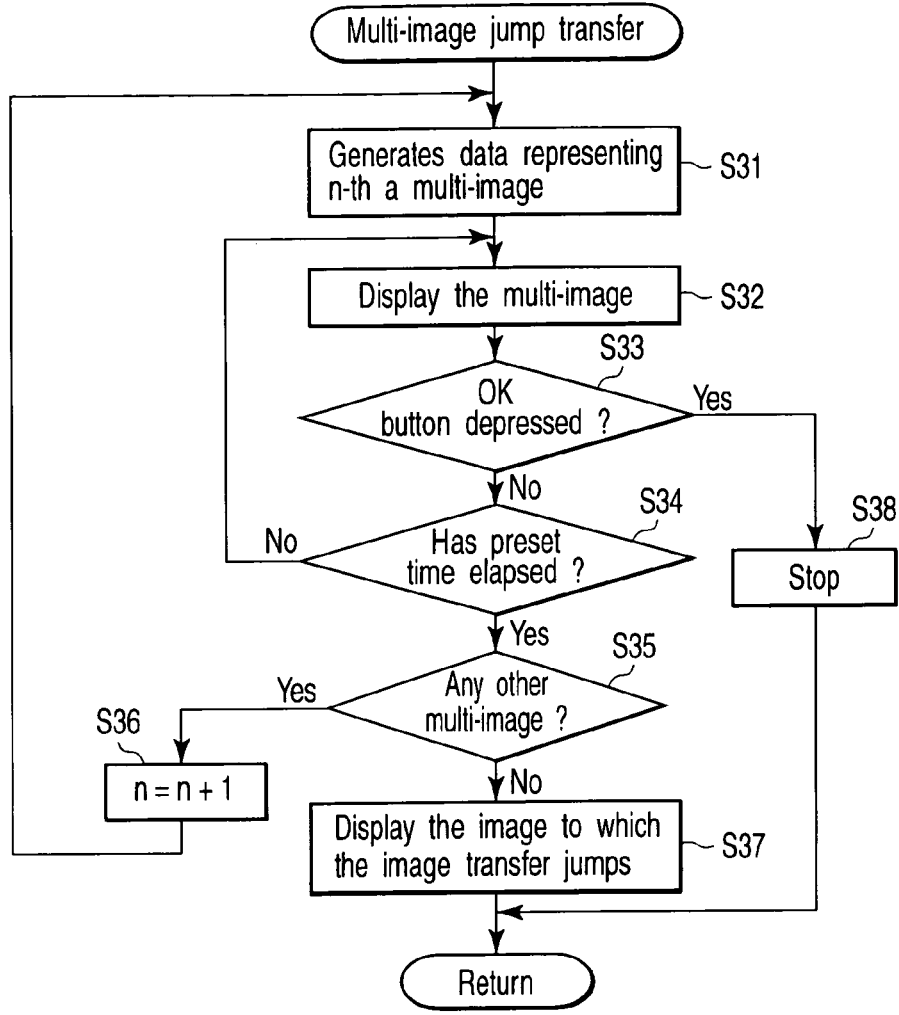
FIG. 9 is a flowchart explaining how the multi-image jump transfer is performed in the third embodiment.

Assume that the LCD panel 54 displays the image of the first frame as shown in FIG. 8A. When the user pushes the pointer-down button 52*d*, the digital camera starts the main routine. In Step S31, the image-processing unit 28 reads image data from the memory card 32 and processes the data, generating data representing a multi-image. The multi-image consists of the frames 2 to 10, which are the first nine of 18 frames intervening between the frame 1 and the frame 20. To generate this multi-image data, the unit 28 performs a known method, which will not be described herein. The image-processing unit 28 does not generate data representing a multi-image consisting of the frames 11 to 19, i.e. other frames intervening between the frame 1 and the frame 20.

In Step S32, the LCD panel 54 displays the multi-image, or the frames 2 to 10 as shown in FIG. 8B. In Step S33, it is determined whether the OK button 56*a* has been depressed. If NO in Step S33, the operation goes to Step S34. In Step S34, it is determined whether the time, e.g., one second, preset in the timer incorporated in the CPU 22 has elapsed. If NO in Step S34, the operation returns to Step S32. If YES in Step S34, the operation goes to Step S35.

In Step S35, it is determined whether there is any other multi-image should be displayed. If YES, the operation goes to Step S36. In Step S36, the number of images, n, is increased to n+1. Then, the operation returns to Step S31. Steps S31 to S35 are then repeated.

If NO in Step S35, the operation goes to Step S37. In Step S37, the LCD panel 54 displays the frame 20 (not shown) to which the image transfer jumps.

The second embodiment can display a plurality of multi-images, one after another. The user can therefore recognize the intervening frames, too, no matter how many.

If YES in Step S33, or if the OK button 56*a* has been depressed, the operation goes to Step S38. In Step S38, the multi-image jump transfer is stopped. As a result, the LCD panel 54 keeps displaying the multi-image (i.e., frames 2 to 10), which was being displayed when the OK button 56*a* was depressed. Since the multi-image jump transfer is no longer performed, the LCD panel 54 displays neither a multi-image (FIG. 8C) nor the frame 20 (not shown) that should be displayed next.

Once the multi-image jump transfer is stopped, the multi-image (i.e., frames 2 to 10) displayed on the LCD panel 54 has a rectangular frame that encircles the frame that the user has selected. The frame may encircle, for example, the center frame 6 as is illustrated in FIG. 8D.

Alternatively, the LCD panel 54 may display only one frame selected, when the multi-image jump transfer is stopped in Step S38.

Thus, the third embodiment can stop the multi-image jump transfer when the user pushes the OK button 56*a* upon finding a desired frame in the multi-image displayed on the LCD panel 54.

Fourth Embodiment

The fourth embodiment of the invention will be described, with reference to FIGS. 10A to 10E that show the information displayed on a display screen and FIG. 11 that is a flowchart.

The camera according to this embodiment performs a multi-image jump transfer, too, but in a different way. To be more specific, the LCD panel 54 continuously displays multi-images, each consisting of a different number of frames, not consisting of nine frames as in the first to third embodiments.

Figure 10A:
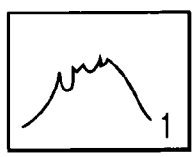
FIGS. 10A to 10E are diagrams displaying how a multi-image jump transfer is performed on the display screen in a fourth embodiment of the present invention.

Assume that the LCD panel 54 displays the image of the first frame, i.e., frame 1, as shown in FIG. 10A. When the user pushes the pointer-down button 52*d*, the digital camera starts the main routine. In Step S41, the image-processing unit 28 generates data representing a first multi-image that should be displayed next to the frame 1. The first multi-image consists of four frames (or, m×m frames). To generate the first multi-image data, the unit 28 performs a known method, which will not be described herein.

Figure 10B:
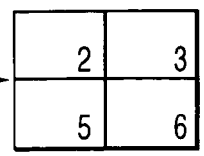

In Step S42, the LCD panel 54 displays the multi-image, or the frames 2, 3, 5 and 6, as shown in FIG. 10B. In Step S43, it is determined whether the time, e.g., one second, preset in the timer (not shown) incorporated in the CPU 22 has elapsed. If NO in Step S43, the operation returns to Step S42. If YES in Step S43, the operation goes to Step S44.

In Step S44, the image-processing unit 28 generates data representing the second multi-image that consists of 3×3 (m+1×m+1, m=2) frames. Namely, the second multi-image consists of nine frames. It is larger and more extending horizontally and vertically by one frame, than the first multi-image that is being displayed.

Figure 10C:
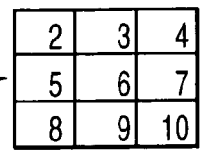

In Step S45, the LCD panel 54 displays the second multi-image consisting of the frames 2 to 10 as is illustrated in FIG. 10C. In Step S46, it is determined whether the time, e.g., one second, preset in the timer has elapsed. If NO in Step S46, the operation returns to Step S45. If YES in Step S46, the operation goes to Step S47.

In Step S47, it is determined whether another multi-image exists, which consists of as many frames as the second multi-image. If YES in Step S47, the operation goes to Step S48. In Step S48, the number of images, n, is increased to n+1. Then, the operation returns to Step S44. Steps S44 to S47 are then repeated.

If NO in Step S47, or if another multi-image does not exists, which consists of as many frames as the second multi-image, the operation goes to Step S49. In Step S49, the image-processing unit 28 generates data representing a third multi-image that consists of 2×2 (m×m, m=2) frames. Namely, the third multi-image consists of four frames. It is smaller and less extending horizontally and vertically by one frame, than the second multi-image that is being displayed.

Figure 10D:
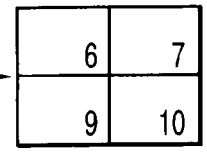

In Step S50, the LCD panel 54 displays the four-frame multi-image as depicted in FIG. 10D. The LCD panel 54 keeps displaying this multi-image until the time, e.g., one second, preset in the timer elapses.

Figure 10E:
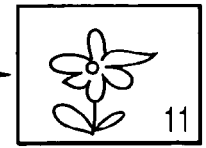

In Step S51, it is determined whether the time, e.g., one second, preset in the timer has elapsed or not. If YES in Step S51, the operation goes to Step S52. In Step S52, the LCD panel 54 displays, as shown in FIG. 10E, the frame 11 to which the image transfer jumps.

In the fourth embodiment, the LCD panel 54 sequentially displays a 1-frame image, a 4-frame image, a 9-frame image, a 4-fame image and a 1-frame image, in the order they are mentioned. In other words, the first and last image the LCD panel 54 displays are 1-frame images, and the intervening images the LCD panel 54 differs in the number of constituent frames. The image displayed can be switched more quickly from a 1-frame image to a 4-frame image, than to a 9-frame image.

In the fourth embodiment, the number of frames the LCD 54 displays at a time is changed. The size of any frame displayed changes in inverse proportion to the number of frames simultaneously displayed. This makes it easier for the user to recognize the frames than the case where each frame is displayed in the same size, no matter whether it is displayed alone or together with any other frames.

In the fourth embodiment, the multi-images consist of four frames or nine frames each. Nonetheless, they may consist of any other number of frames.

The multi-image shown in FIG. 10B consists of first adjacent four (i.e., frames 2, 3, 5 and 6) of the frames 2 to 10 constituting the nine-frame multi-image depicted in FIG. 10C. The multi-image shown in FIG. 10D consists of the other four adjacent frames (i.e., frames 6, 7, 9 and 10). Instead, the first multi-image may consists of the first four consecutive frames 2 to 5, and the second multi-image may consists of the next four consecutive frames 6 to 9.

Fifth Embodiment

The fifth embodiment of this invention will be described, with reference to FIGS. 12A to 12E that show the information displayed on a display screen and FIG. 13 that is a flowchart.

The camera according to the fifth embodiment performs a multi-image jump transfer, too. Nevertheless, some multi-images may not be displayed once the multi-image jump transfer has been initiated.

Figure 11:
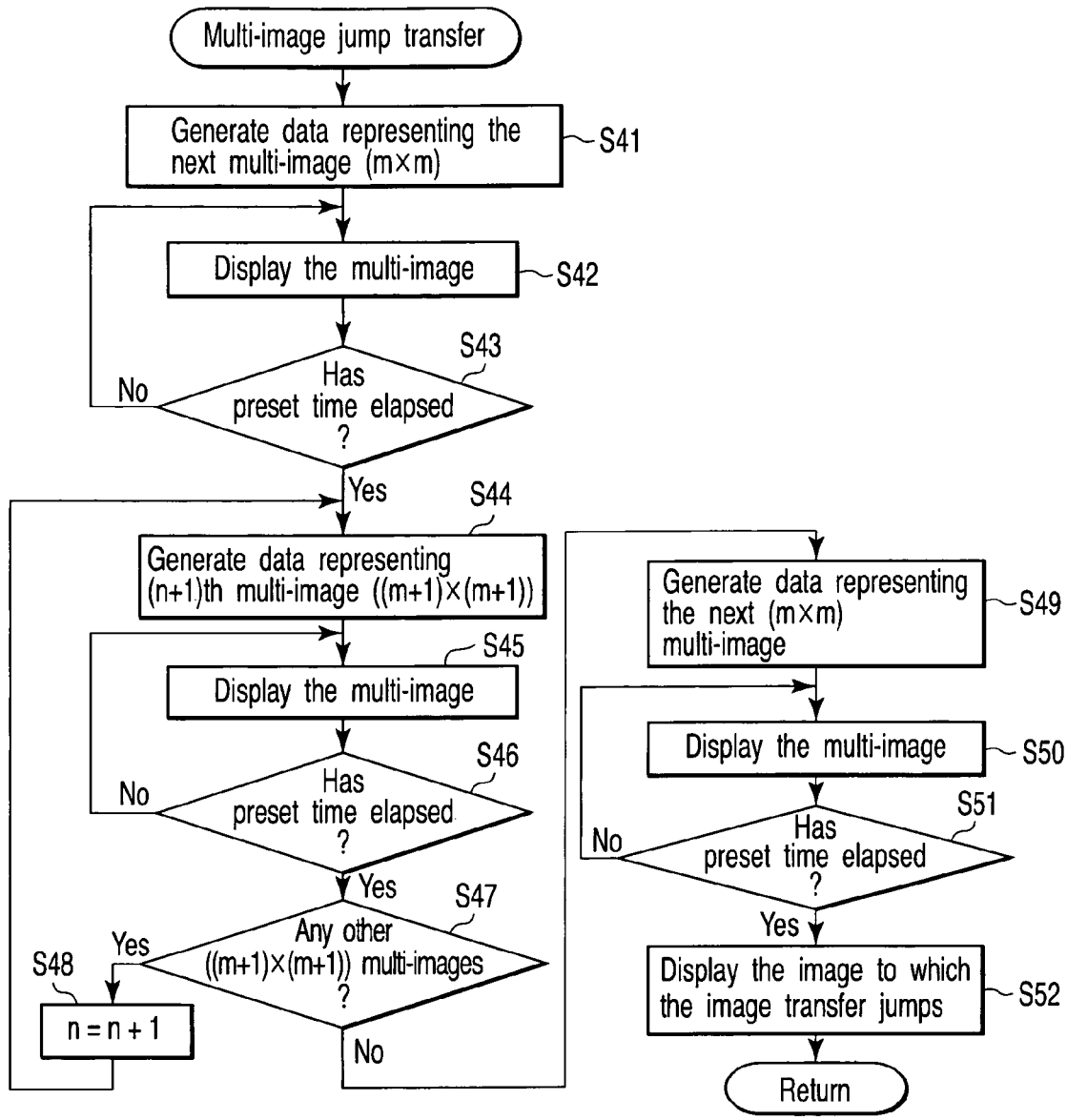
FIG. 11 is a flowchart explaining how the multi-image jump transfer is carried out in the fourth embodiment.
Figures 12A, 12B, 12C, 12D, 12E:
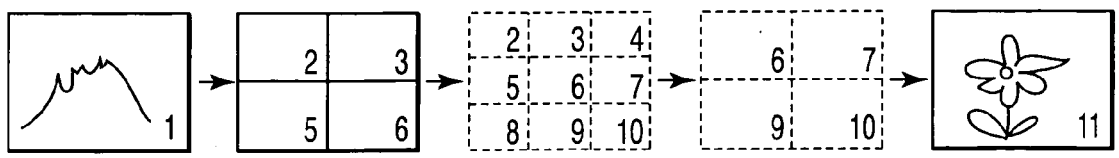
FIGS. 12A to 12E are diagrams showing how a multi-image jump transfer is performed on the display screen in a fifth embodiment of the invention.
Figure 13:
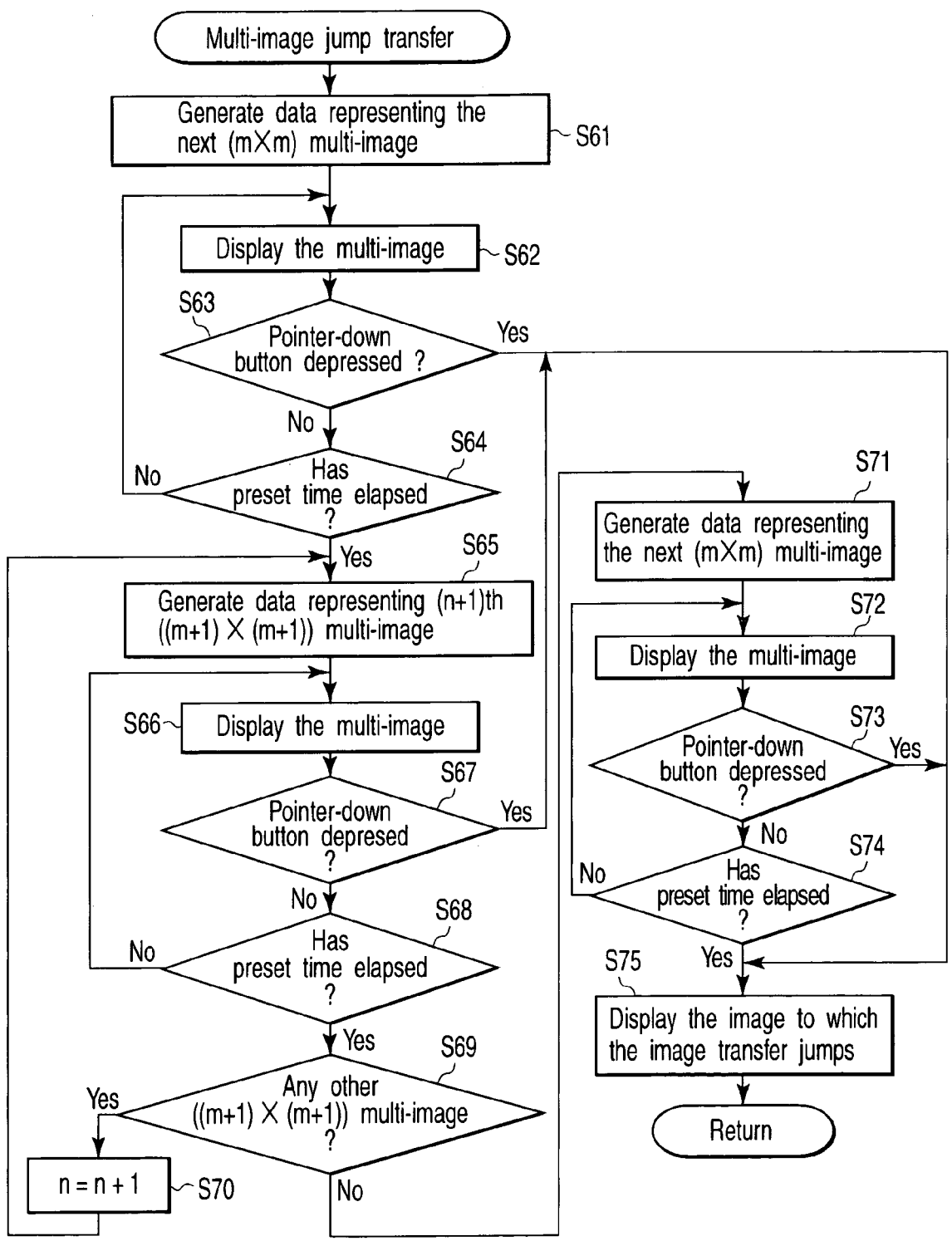
FIG. 13 is a flowchart illustrating how the multi-image jump transfer is carried out in the fifth embodiment.

Assume that the LCD panel 54 displays the image of the first frame, i.e., frame 1, as shown in FIG. 12A. When the user pushes the pointer-down button 52d, the digital camera starts the main routine. In Steps S61, the image-processing unit 28 generates data representing a first multi-image that should be displayed next to the frame 1, as in Step S41 shown in the flowchart of FIG. 11. Then, in Step S62, the LCD panel 54 displays the first multi-image, which consists of four frames (or, m×m frames), as in Step S42 shown in the flowchart of FIG. 11.

In Step S63, it is determined whether the whether the pointer-down button 52d has been depressed while the LCD panel 54 is displaying the 4-frame multi-image. If YES in Step S63, the operation jumps to Step S75. If NO in Step S63, the operation goes to Step S64.

In Step S64, it is determined whether the time, e.g., one second, preset in the timer (not shown) provided in the CPU 22 has elapsed or not. If NO in Step S64, the operation returns to Step S62. If YES in Step S64, the operation goes to Step S65.

In Step S65, the image-processing unit 28 generates data representing a second multi-image that consists of 3×3 (m+1×m+1, m=2) frames. Namely, the second multi-image consists of nine frames. It is larger and more extending horizontally and vertically by one frame, than the first multi-image that is being displayed.

Next, in Step S66, the LCD panel 54 displays the second multi-image consisting of nine frames. In Step S67, it is determined whether the pointer-down button 52d has been depressed while the LCD panel 54 is displaying the 9-frame multi-image. If YES in Step S67, the operation jumps to Step S75. If NO in Step S67, the operation goes to Step S68.

In Step S68, it is determined whether the time, e.g., one second, preset in the timer has elapsed. If NO in Step S68, the operation returns to Step S66. If YES in Step S68, the operation goes to Step S69.

Steps S69 to S72 are identical to Steps 47 to 50 shown in the flowchart of FIG. 11, and will not be explained in detail.

In Step S73, it is determined whether the pointer-down button 52d has been depressed while the LCD panel 54 is displaying the 4-frame multi-image. If YES in Step S73, the operation jumps to Step S75. If NO in Step S73, the operation goes to Step S74.

In Step S74, it is determined whether the time, e.g., one second, preset in the timer has elapsed. If NO in Step S74, the operation returns to Step S72. If YES in Step S74, the operation goes to Step S75. In Step S75, the LCD panel 54 displays, as shown in FIG. 12E, the frame 11 to which the image transfer jumps.

In Step S63, S67 or S73, it may be determined that the pointer-down button 52d has been depressed. If this is the case, the operation goes to Step S75. If it is determined in, for example, Step S63 that the button 52d has been depressed, the LCD panel 54 stops displaying the 4-frame multi image. Thereafter, the LCD panel 54 displays neither the 9-frame multi image of FIG. 12C nor the 4-frame multi-image of FIG. 12D, and the operation goes to Step S75. In Step S75, the LCD panel 54 displays, as shown in FIG. 12E, the frame 11 that should be displayed next.

Thus, the image transfer can jump from the frame 1 (FIG. 12A) to the frame 11 (FIG. 12E). That is, the LCD does not display the intervening frames 2 to 10 at all.

Sixth Embodiment

The sixth embodiment of this invention will be described.

Figure 14A:
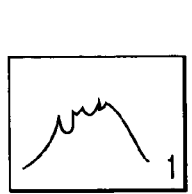
FIGS. 14A to 14C are diagrams showing the information displayed on a display screen in the sixth embodiment and explaining how a continuous reproduced-image jump transfer is performed.
Figure 14B:
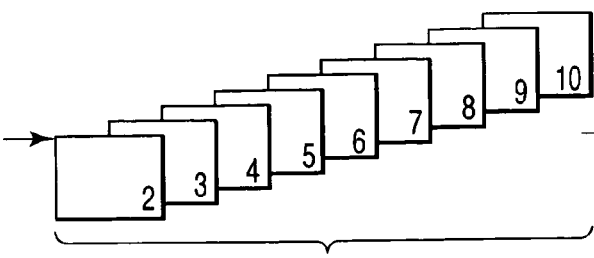
Figure 14C:
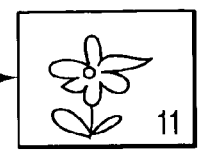
Figure 15:
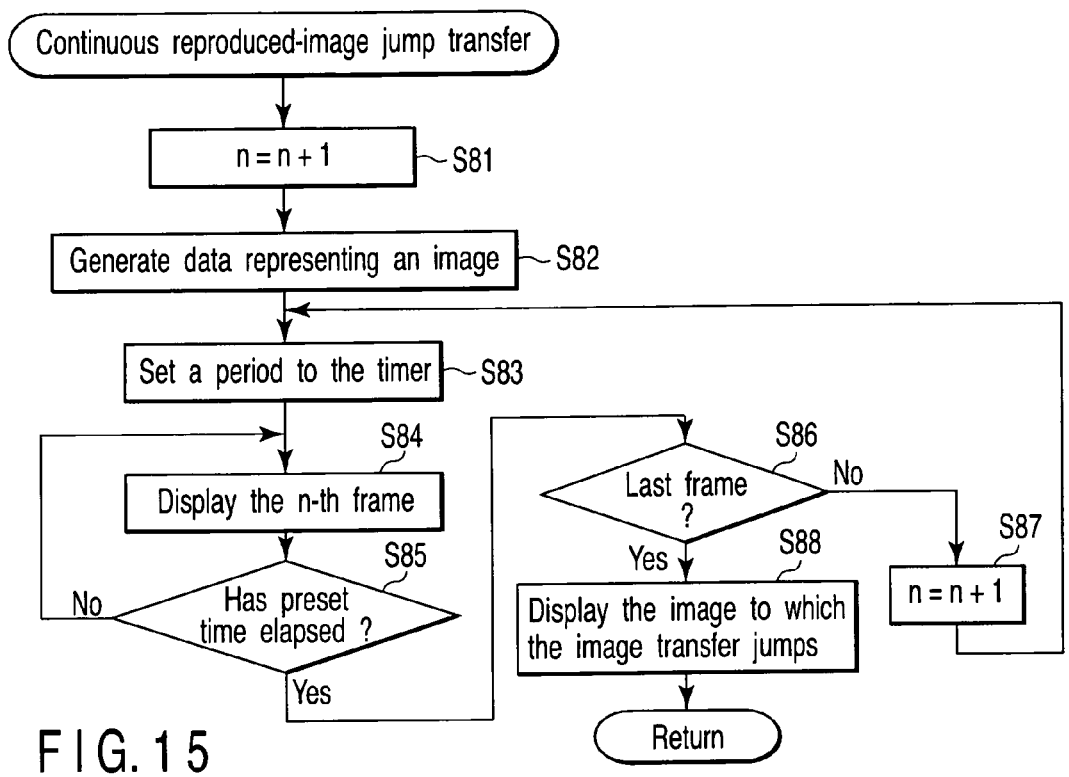
FIG. 15 is a flowchart explaining how the continuous reproduced-image jump transfer is carried out in the sixth embodiment.

FIGS. 14A to 14C are diagrams showing the information displayed on a display screen in the sixth embodiment and explaining how a continuous reproduced-image jump transfer is performed. FIG. 15 is a flowchart explaining how a continuous reproduced-image jump transfer is carried out in the sixth embodiment.

A digital camera according to the sixth embodiment is identical to the first embodiment in structure and operation, except that performs the continuous reproduced-image transfer. Hence, the components identical to those of the first embodiment will not be described but will be referred to, by using the same numerals.

How this camera operates will be described, with reference to the flowchart of FIG. 3. If NO in Step S7, or if it is determined that the image of any intervening frame is a multi-image that consists of two or more frames to be displayed on the LCD display 54 at the same time, the digital camera starts the routine of the continuous reproduced-image jump transfer.

If the user pushes the pointer-down button 52d while the LCD display 54 is displaying the frame 1 as shown in FIG. 14A, the camera starts the main routine. In Step S81, the number of frame 1 being displayed, i.e., "1", is increased to "2." The first frame to be displayed in the continuous reproduced-image transfer is set. In Step S82, the image-processing unit 28 generates data representing the frame 2.

In Step S83, the periods for which the images represented by the data should be displayed, respectively, are set to the timer (not shown) incorporated in the CPU 22. Each of the first few images is displayed longer than the following one, and each of the remaining images is displayed shorter than the following one. For example, the periods for which the images are displayed, respectively, are set as is shown in Table 1 set forth below. The contents of Table 1 are stored in the CPU 22 or a memory (not shown) provided outside the CPU 22.

TABLE 1

Different Periods of Displaying Frames

| Frame No. | Actual Frame No. | Display Period (sec) |
|---|---|---|
| n + 1 | 2 | 0.3 |
| +2 | 3 | 0.3 |
| +3 | 4 | 0.2 |
| +4 | 5 | 0.2 |
| +5 | 6 | 0.1 |
| +6 | 7 | 0.1 |
| +7 | 8 | 0.2 |
| +8 | 9 | 0.3 |
| +9 | 10 | 0.3 |

More specifically, the image transfer jumps from the frame 1 to the frame 11. Of the frames intervening these frames 1 and 11, the frames 2 and 3 are displayed for 0.3 seconds, the frames 4 and 5 for 0.2 seconds, the frames 6 an 7 for 0.1 seconds, the frame 8 for 0.2 seconds, and the frames 9 and 10 for 0.3 seconds.

In Step S84, the LCD panel 54 displays the frame represented by the data generated in Step S82. In Step S85, it is determined whether the display period set in Step S83 for this frame has elapsed. The display period corresponding to the serial number of the frame is determined.

Next, in Step S86, it is determined whether the continuous image reproduction comes to the last frame, i.e., frame 10. If NO in Step S86, the operation goes to Step S87. In Step S87, the frame number n, is increased to n+1. Thereafter, the operation returns to Step S82. Steps S82 to S86 are repeated. Thus, the frames intervening the frame 1 and the frame 11 are displayed one after another, each for a different period, as is illustrated in FIG. 14B.

If YES in Step S86, or if the continuous image reproduction comes to the last frame, i.e., frame 10, the operation goes to Step S88. In Step S88, the LCD 54 displays the last frame 11, to which the image transfer has jumped from the frame 1, as is illustrated in FIG. 14C.

Thus, in the sixth embodiment, the frames intervening the first and last frames are displayed, not at regular intervals, but each for a different period. This makes the user feel that the image transfer proceeds more vividly and renders it easier for the user to retrieve any desired frame. Further, the middle part of the series of frames can be quickly displayed, because this part consists of frames (e.g., frames 6 and 7) that are displayed, each for a shorter period than the other frames.

Seventh Embodiment

The seventh embodiment of this invention will be described.

In the sixth embodiment, the frames intervening the frame 1 and the frame 11 are sequentially displayed, each for a different period. In the seventh embodiment, each intervening frame is displayed for a period that is proportional to the period between the photographing of the frame and the photographing of the immediately preceding frame.

In the seventh embodiment, the continuous reproduced-image jump transfer is performed in the same way as in the sixth embodiment and as shown in the flowchart of FIG. 15, except for one respect only. That is, the periods for which the intervening frames should be displayed and which are set to the timer are different from those shown in Table 1.

To be more specific, the periods set to the timer are as shown in the following Table 2 and as will be explained below, with reference to FIGS. 16A to 16C.

TABLE 2

Different Periods of Displaying Frames

| Frame No. | Actual Frame No. | Photo. Interval | Display Period (sec) |
|---|---|---|---|
| n + 1 | 2 | — | |
| +2 | 3 | 1 hr or more | 0.6 |
| +3 | 4 | less than 1 hr | 0.3 |
| +4 | 5 | less than 1 hr | 0.3 |
| +5 | 6 | 1 hr or more | 0.6 |
| +6 | 7 | less than 1 hr | 0.3 |
| +7 | 8 | 1 hr or more | 0.6 |
| +8 | 9 | less than 1 hr | 0.3 |
| +9 | 10 | less than 1 hr | 0.3 |

The data representing each frame contains data item that shows when the frame has been photographed. The CPU 22 reads two data items from the memory card 32, one item indicating the time of photographing one frame and the other item indicating the time of photographing the immediately following frame. The CPU 22 then compares these data items, calculating the photographing interval.

Figures 16A, 16B, 16C:
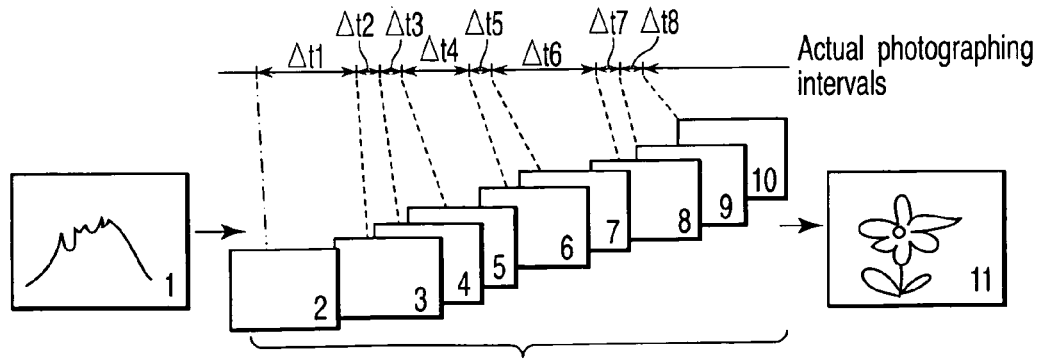
FIGS. 16A to 16C are diagrams displaying how a continuous reproduced-image jump transfer is performed on the display screen in a seventh embodiment of this invention.

After displaying the first as shown in FIG. 16A, the LCD 54 displays the second frame, which is the first intervening frame. Then, the LCD 54 displays the second frame for 0.6 seconds because the second and third frames have been photographed with time gap Δt1 of one hour or more as shown in Table 2. Next, the LCD 54 displays the third frame and the fourth frame sequentially, each for 0.3 seconds, because the third and fourth frames have been photographed with time gap Δt2 of less than hour and the fourth and fifth frames have been photographed with time gap Δt3 of less than hour. Similarly, the LCD 54 displays the sixth to tenth frames, each for a different period determined by the time gap between the photographing of the frame and the photographing of the immediately preceding frame. Thus, as FIG. 16B depicts, the frames 2 to 10 intervening between the frames 1 and 11 are displayed for different periods.

Finally, the LCD panel 54 displays the frame 11 to which the image transfer has jumped from the frame 1, as is illustrated in FIG. 16C.

As described above, the frames intervening between the first and last frames are displayed not for the same period in the seventh embodiment. Rather, they are displayed for different periods, each period determined by the time gap between the photographing of the frame and the photographing of the immediately preceding frame. This enables the user to retrieve any desired frame within a short time.

Eighth Embodiment

Figures 17A, 17B, 17C:
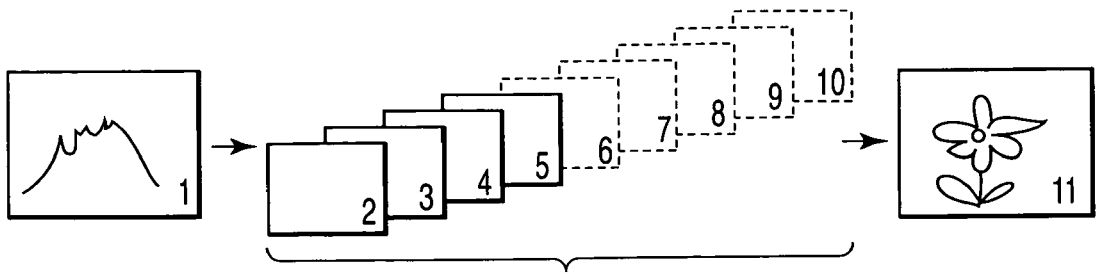
FIGS. 17A to 17C are diagrams showing how a continuous reproduced-image jump transfer is performed on the display screen in an eighth embodiment of the present invention.
Figure 18:
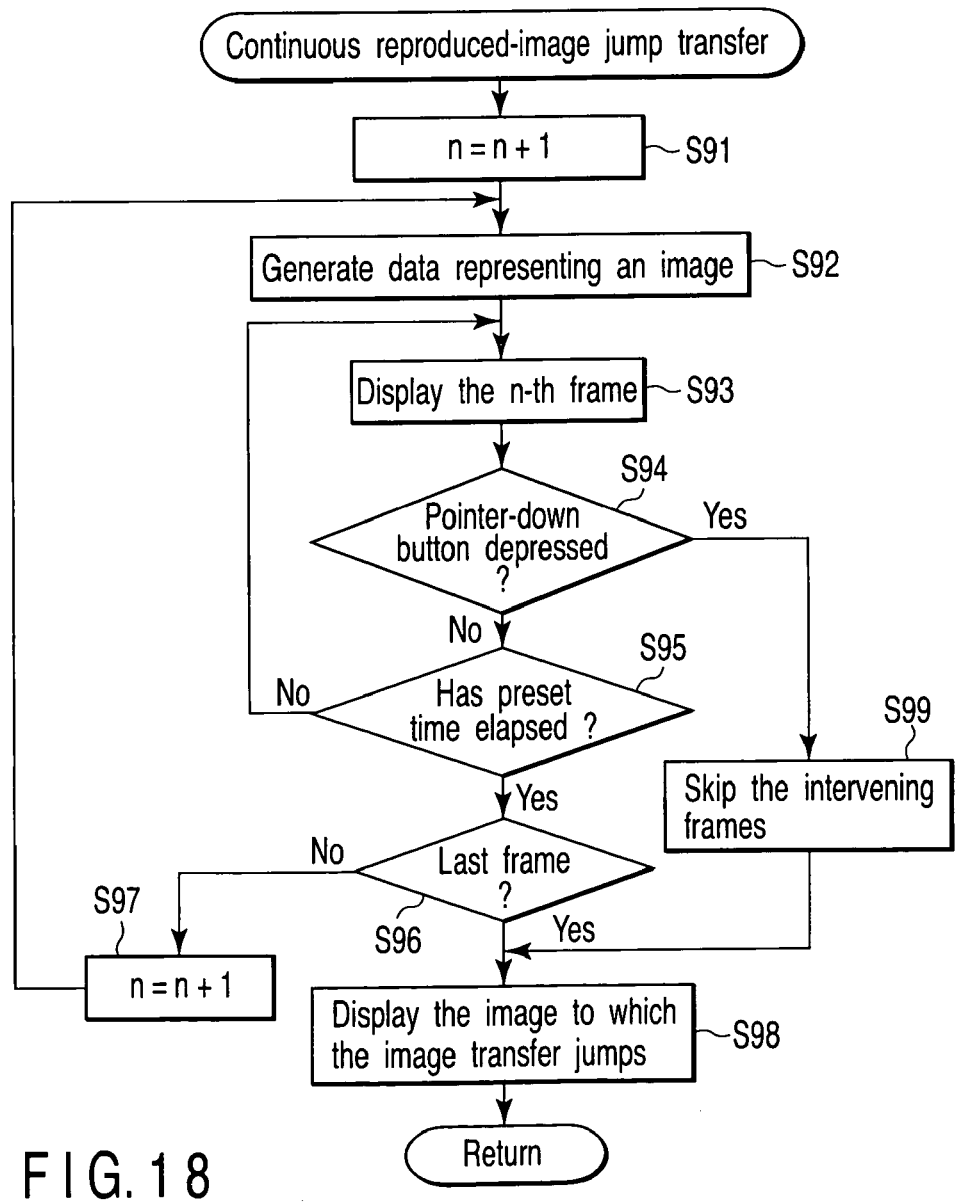
FIG. 18 is a flowchart explaining how the continuous reproduced-image jump transfer is carried out in the eighth embodiment.

The eighth embodiment of the invention will be described, with reference to FIG. 17A to 17C and FIG. 18. FIGS. 17A to 17C are diagrams showing the information displayed on a display screen in the eighth embodiment. FIG. 18 is a flowchart.

In the eighth embodiment, the continuous reproduced-image jump transfer is performed, in which some of the frames intervening the first and last frames are not displayed at all.

First, the LCD panel 54 displays the image of the first frame, i.e., frame 1, as shown in FIG. 17A. When the user pushes the pointer-down button 52d, the digital camera starts the main routine. In Step S91, the number of frame 1 being displayed, i.e., "1", is increased to "2." The first frame to be displayed in the continuous reproduced-image transfer is set. In Step S92, the image-processing unit 28 generates data representing the frame 2. In Step S92, the LCD panel 54 displays the frame 2 represented by the data.

In Step S94, it is determined whether the pointer-down button 52d has been depressed. If YES in Step S94, the operation jumps to Step S99. If NO in Step S94, the operation goes to Step S95.

In Step S95, it is determined whether the time, e.g., one second, preset in the timer provided in the CPU 22 has elapsed. If NO in Step S95, the operation returns to Step S93. If YES in Step S95, the operation goes to Step S96.

In Step S96, it is determined whether the last intervening frame, i.e., the frame 10, has been subjected to the continuous reproduction. If NO in Step S96, the operation goes to Step S97. In Step S97, the number of frame, n, is increased to n+1. Thereafter, the operation returns to Step S92. Steps S92 to S96 are then repeated.

If YES in Step S96, or if the last intervening frame (i.e., frame 10) has been subjected to the continuous reproduction, the operation goes to Step 98. In Step S98, the LCD panel 54 displays the frame 11 to which the image transfer has jumped from the frame 1, as is depicted in FIG. 17C.

If YES in Step S94, or if the pointer-down button 52d has been depressed, the operation jumps to Step S99. In Step S99, the frames 6 to 10 are skipped. Thus, as shown in FIG. 17B, the frames 6 to 10 are not displayed at all. The operation then goes to Step S98, in which the LCD panel displays the frame 11 to which the image transfer has jumped from the frame 1.

In the eighth embodiment, the last several of the frames intervening the first frame 1 and the last several frame 11 are not displayed at all. Hence, the image transfer can jump to the last frame more quickly. This enables the user to retrieve any desired frame faster.

Ninth Embodiment

Figures 19A, 19B, 19C:
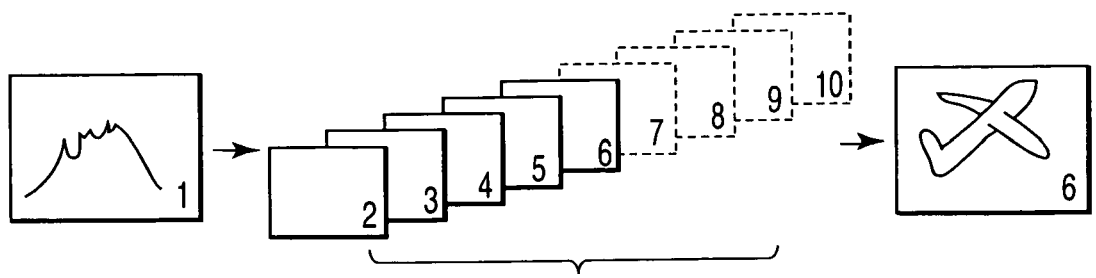
FIGS. 19A to 19C are diagrams showing how a continuous reproduced-image jump transfer is performed on the display screen in a ninth embodiment of the invention.
Figure 20:
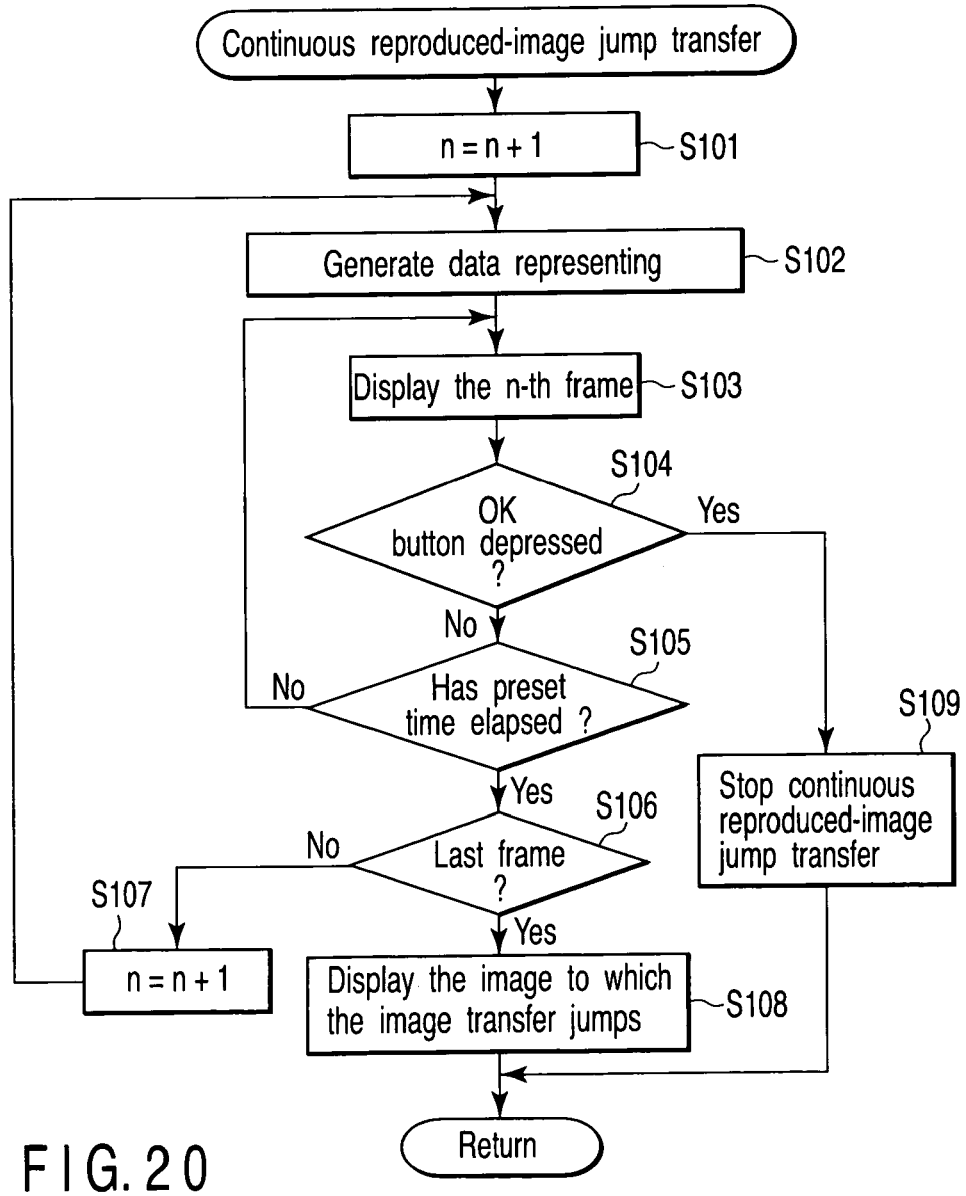
FIG. 20 is a flowchart explaining how the continuous reproduced-image jump transfer is carried out in the ninth embodiment.

The ninth embodiment of this invention will be described, with reference to FIG. 19A to 19C and FIG. 20. FIGS. 19A to 19C are diagrams showing the information displayed on a display screen in the ninth embodiment. FIG. 20 is a flowchart.

The camera according to the ninth embodiment performs a continuous reproduced-image jump transfer. It can display the frames intervening between the first frame displayed and the last frame to be displayed, continuously one after another.

Assume that the LCD panel 54 displays the image of the first frame, i.e., frame 1, as shown in FIG. 19A. When the user pushes the pointer-down button 52d, the digital camera starts the main routine. Steps S101 to S103 are sequentially performed. These steps, which are identical to Steps S91 to S93 shown in FIG. 18, will not be described here.

In Step S104, it is determined whether the OK button 56a has been depressed. If NO in Step S104, the operation goes to Step S105. In Step S105, it is determined whether the time, e.g., one second, preset in the timer incorporated in the CPU 22 has elapsed. If NO in Step S105, the operation returns to Step S103. If YES in Step S105, the operation goes to Step S106.

In Step S106, it is determined whether the last intervening frame, i.e., the frame 10, has been subjected to the continuous reproduction. If NO in Step S106, the operation goes to Step S107. In Step S107, the number of frame, n, is increased to n+1. Thereafter, the operation returns to Step S102. Steps S102 to S106 are then repeated.

If YES in Step S106, or if the last intervening frame (i.e., frame 10) has been subjected to the continuous reproduction, the operation goes to Step S108. In Step S108, the LCD panel 54 displays the frame 11 to which to which the image transfer has jumped from the frame 1.

If YES in Step S104, or if the OK button 56a is depressed, the operation goes to Step S109. In Step S109, the continuous reproduced-image jump transfer is stopped. In this case, the LCD panel 54 displays the last frame subjected to the transfer, e.g., the frame 6, as is illustrated in FIG. 19C. Now that the continuous transfer of the intervening frame has been stopped, the frames 7 to 10 are not displayed.

Thus, the user can stop the continuous transfer of the intervening frames when he or she finds a frame to retrieve or when he or she wants to stop searching for desired frames.

Tenth Embodiments

Figures 21A, 21B, 21C:
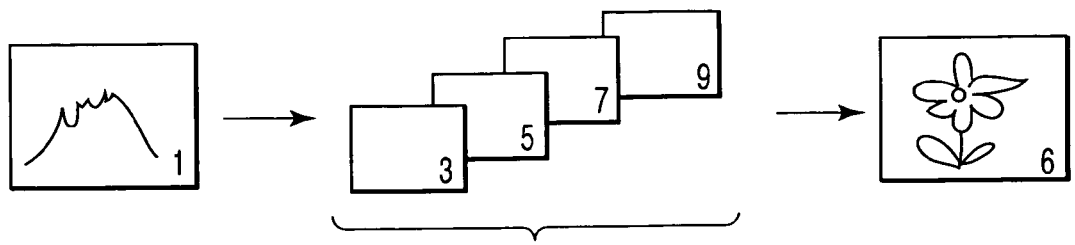
FIGS. 21A to 21C are diagrams showing how a continuous reproduced-image jump transfer is performed on the display screen in a tenth embodiment of the present invention.
Figure 22:
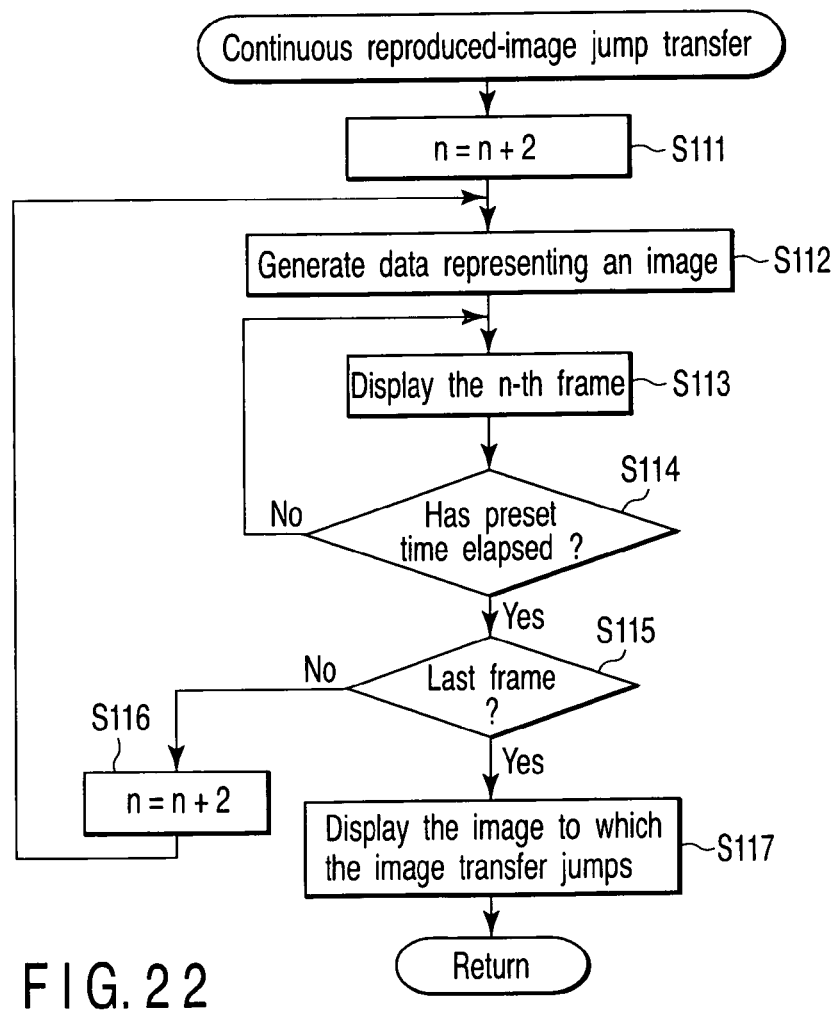
FIG. 22 is a flowchart explaining how the continuous image-jump transfer is carried out in the tenth embodiment.

The tenth embodiment of this invention will be described, with reference to FIG. 21A to 21C and FIG. 22. FIGS. 21A to 21C are diagrams showing the information displayed on a display screen in the tenth embodiment. FIG. 22 is a flowchart.

The camera according to the tenth embodiment performs a continuous reproduced-image jump transfer, too. It can display only specified ones of the frames intervening between the first and last frames 1 and 11.

First, the LCD panel 54 displays the first frame, i.e., frame 1, as illustrated in FIG. 21A. When the user pushes the pointer-down button 52d, the digital camera starts the main routine. In Step S111, the number of frame 1 being displayed, i.e., "1", is increased by a specific value. The value of increment may be any number desired. In this case, it is "2." Hence, the number of frame is increased from "1" to "3."

In Step S112, the image-processing unit 28 generates data representing the frame 3. In Step S113, the LCD panel 54 displays the frame 3 represented by the data.

In Step S114, it is determined whether the time, e.g., one second, preset in the timer incorporated in the CPU 22 has elapsed. If NO in Step S114, the operation returns to Step S113. If YES in Step S114, the operation goes to Step S115.

In Step S115, it is determined whether the last intervening frame, i.e., the frame 9 in this case, has been subjected to the continuous reproduction. If NO in Step S115, the operation goes to Step S116. In Step S116, the number of frame, n, is increased to n+2. Thereafter, the operation returns to Step S112. Steps S112 to S115 are then repeated.

If YES in Step S115, or if the last intervening frame (i.e., frame 9) has been subjected to the continuous reproduction, the operation goes to Step S117. In Step S117, the LCD panel 54 displays the frame 11 to which to which the image transfer has jumped from the frame 1, as is illustrated in FIG. 21C.

Thus, the LCD panel 54 can display one intervening frame out of very n frames, for example, every other intervening frame as is shown in FIG. 21B.

Hence, the time required to display the frame intervening between the first frame 1 and the last frame 11 can be shortened in the tenth embodiment.

In the embodiments described above, the image jump transfer proceeds in the ascending order of frames. Instead, it may proceed in the descending order of frames in the present invention.

Further, the image jump transfer is carried out on the basis of the serial numbers of the frames. Instead, it may be performed in accordance with the numbers assigned to the frames to accomplish an efficient management of the frames.

The embodiments described above are digital cameras. This invention is not limited to digital cameras, nonetheless. The present invention can be applied to apparatuses of any other types that reproduce image data from recording media and display the images represented by the data, such as the camera unit for use in mobile telephones, the display unit for use in PDAs, and the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image display apparatus comprising:
   an image-processing unit which generates data representing images to be displayed;
   an image display unit which displays images represented by the data generated by the image-processing unit; and
   a display control unit which controls the image-processing unit and the image display unit; and
   a jump-instructing unit which instructs the image display unit to display an image whose serial number differs, by a predetermined number, from that of the image being displayed by the image display unit,
   wherein, in response to an instruction from the jump-instructing unit, the display control unit causes the image-processing unit to generate data representing a multi-image consisting of images intervening between the image being displayed and the image whose serial number differs by the predetermined number.

2. The image display apparatus according to claim 1, wherein the display control unit causes the image display unit to display the images constituting the multi-image, one after another, as intervening images.

3. The image display apparatus according to claim 2, wherein the display control unit causes the image-processing unit to generate data representing a plurality of multi-images used as intervening images, the multi-images including at least one intervening images having a different number of small images the other intervening images, and causes the image display unit to display the multi-image consisting of the intervening frames.

4. The image display apparatus according to claim 3, further comprising a display-stop instructing unit which instruct the image display unit to stop displaying the intervening images,
   wherein, in response to an instruction from the display-stop instructing unit, the display control unit causes the image display unit to stop displaying the intervening images and then to display the image whose serial number differs by the predetermined number.

5. The image display apparatus according to claim 4, further comprising a display-continuation instructing unit which instructs the image display unit to display the intervening images continuously,
   wherein, in response to an instruction from the display-continuation instructing unit, the display control unit causes the image display unit to display at least one of the images constituting the multi-image continuously.

6. The image display apparatus according to claim 2, further comprising a display-stop instructing unit which instructs the image display unit to stop displaying the intervening images,
   wherein, in response to an instruction from the display-stop instructing unit, the display control unit causes the image display unit to stop displaying the intervening images and then to display the image whose serial number differs by the predetermined number.

7. The image display apparatus according to claim 2, further comprising a display-continuation instructing unit which instruct the image display unit to display the intervening images continuously,
   wherein, in response to an instruction from the display-continuation instructing unit, the display control unit causes the image display unit to display at least one of the images constituting the multi-image continuously.

8. The image display apparatus according to claim 1, further comprising a display-continuation instructing unit which instructs the image display unit to display the intervening images continuously,
    wherein, in response to an instruction from the display-continuation instructing unit, the display control unit causes the image display unit to display at least one of the images constituting the multi-image continuously.

9. A camera comprising an image display apparatus of the type described in claim 1.

10. An image display apparatus comprising:
    an image display unit which displays images;
    a display control unit which controls the image display unit; and
    a jump-instructing unit which instructs the image display unit to display an image whose serial number differs, by a predetermined number, from that of the image being displayed by the image display unit,
    wherein, in response to an instruction from the jump-instructing unit, the display control unit causes the image display unit to display images intervening between the image being displayed and the image whose serial number differs by the predetermined number, each for a different period, and then to display the image whose serial number differs by the predetermined number.

11. The image display apparatus according to claim 10, wherein the display control unit causes the image display unit to display the first several intervening images and the hast several intervening images, each for a period longer than each of the intermediate intervening images.

12. The image display apparatus according to claim 10, wherein the display control unit changes the period for which each intervening image is displayed, in accordance with data and time of photographing the intervening image.

13. The image display apparatus according to claim 12, wherein the display control unit changes the period for which each intervening image is displayed, in accordance with a time gap between the photographing of the image and the photographing of an immediately preceding frame.

14. The image display apparatus according to claim 10, further comprising a display-stop instructing unit which instructs the image display unit to stop displaying the intervening images,
    wherein, in response to an instruction from the display-stop instructing unit, the display control unit causes the image display unit to stop displaying the intervening images and then to display the image whose serial number differs by the predetermined number.

15. The image display apparatus according to claim 10, further comprising a display-continuation instructing unit which instructs the image display unit to the intervening images continuously,
    wherein, in response to an instruction from the display-continuation instructing unit, the display control unit causes the image display unit to display the intervening images continuously.

16. A camera comprising an image display apparatus of the type described in claim 10.

17. A method of controlling an image display apparatus, in which the image display unit of the apparatus displays images in the order of the serial numbers of the images, in response to an instruction, said method comprising steps of:
    instructing the image display unit to display an image whose serial number differs, by a predetermined number, from that of the image being displayed;
    generating data representing a multi-image consisting of images intervening between the image being displayed and the image whose serial number differs by the predetermined number; and
    displaying the intervening images and then to display the image whose serial number differs by the predetermined number.

18. A method of controlling an image display apparatus, in which the image display unit of the apparatus displays images in the order of the serial numbers of the images, said method comprising steps of:
    instructing the image display unit to display an image whose serial number differs, by a predetermined number, from that of the image being displayed; and
    causing the image display unit to display images intervening between the image being displayed and the image whose serial number differs by the predetermined number, each for a different period, and then to display the image whose serial number differs by the predetermined number, when the image display unit is instructed, in the instructing step, to display the image whose serial number differs.

19. A computer-readable medium storing an image display control program that is executed by a computer to cause an image display unit to display images in the order of the serial numbers of the images, in response to an instruction, said program describing the steps of:
    instructing the image display unit to display an image whose serial number differs, by a predetermined number, from that of the image being displayed;
    generating data representing a multi-image consisting of images intervening between the image being displayed and the image whose serial number differs by the predetermined number, when the image display unit is instructed to display the image whose serial number differs; and
    causing the image display unit to display the intervening images represented by the data generated, and then to display the image whose serial number differs by the predetermined number.

20. A computer-readable medium storing an image display control program that is executed by a computer to cause an image display unit to display images in the order of the serial numbers of the images, in response to an instruction, said program describing the steps of:
    instructing the image display unit to display an image whose serial number differs, by a predetermined number, from that of the image being displayed; and
    causing the image display unit to display images intervening between the image being displayed and the image whose serial number differs by the predetermined number, each for a different period, and then to display the image whose serial number differs by the predetermined number, when the image display unit is instructed to display the image whose serial number differs.

* * * * *